(12) United States Patent
Yuki

(10) Patent No.: US 10,431,925 B2
(45) Date of Patent: Oct. 1, 2019

(54) MOUNTING STRUCTURE FOR ELECTRICAL DEVICE IN VEHICLE

(71) Applicant: TOYOTA JIDOSHA KABUSHIKI KAISHA, Toyota-shi, Aichi (JP)

(72) Inventor: Keisuke Yuki, Toyota (JP)

(73) Assignee: TOYOTA JIDOSHA KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/182,939

(22) Filed: Nov. 7, 2018

(65) Prior Publication Data

US 2019/0173225 A1   Jun. 6, 2019

(30) Foreign Application Priority Data

Dec. 5, 2017   (JP) ................. 2017-233481

(51) Int. Cl.
*H01R 13/53* (2006.01)
*H01R 13/533* (2006.01)
*H01R 13/73* (2006.01)

(52) U.S. Cl.
CPC ........... *H01R 13/533* (2013.01); *H01R 13/73* (2013.01); *H01R 2201/26* (2013.01)

(58) Field of Classification Search
CPC .................................................. H01R 13/533
See application file for complete search history.

(56) References Cited

U.S. PATENT DOCUMENTS

| | | | | | |
|---|---|---|---|---|---|
| 4,799,895 A | * | 1/1989 | Borgstrom | ............. | H01R 13/53 439/183 |
| 5,562,477 A | * | 10/1996 | Moore | ............... | H01R 13/5208 439/383 |
| 2008/0261414 A1 | * | 10/2008 | Mizutani | .............. | H01R 13/533 439/34 |
| 2013/0316573 A1 | * | 11/2013 | Uno | ........................ | H01R 11/12 439/573 |
| 2014/0024266 A1 | * | 1/2014 | Kashiwada | ........ | H01R 13/6315 439/686 |
| 2016/0233609 A1 | * | 8/2016 | Aida | ................... | H01R 13/5213 |
| 2016/0294110 A1 | * | 10/2016 | Motohashi | ........... | H01R 13/533 |
| 2018/0254580 A1 | * | 9/2018 | Goulds | ................ | H01R 13/533 |

FOREIGN PATENT DOCUMENTS

JP   2017-047758 A   3/2017

* cited by examiner

*Primary Examiner* — James Harvey
(74) *Attorney, Agent, or Firm* — Oliff PLC

(57) ABSTRACT

An electrical device is supported by a bracket above a transaxle in a front compartment of a vehicle. A DC power connector and an air conditioning connector are connected with a back face of a housing of the electrical device. The DC power connector has a higher strength than the air conditioning connector. A rear end of the DC power connector is located on a rear side than a rear end of the air conditioning connector.

2 Claims, 5 Drawing Sheets

MOUNTING STRUCTURE FOR ELECTRICAL DEVICE IN VEHICLE

CROSS-REFERENCE TO RELATED APPLICATION

This application claims priority to Japanese patent application No. 2017-233481, filed on Dec. 5, 2017, the entire contents of which are incorporated herein by reference.

TECHNICAL FIELD

The disclosure herewith relates to a mounting structure for an electrical device in a front compartment of a vehicle.

BACKGROUND

With advancements in computerization in vehicles in recent years, various types of electrical devices are mounted in a front compartment of a vehicle. Especially with an electric vehicle, a power converter that converts power from a DC power source to driving power of a traction motor is further included, and numbers of electrical devices are mounted in a front compartment where a space is limited. For example, JP 2017-47758 A describes a structure for mounting a power converter for converting power from a power source to driving power of a motor in a front compartment. The power converter is supported above a transaxle by front and rear brackets. A gap is secured between the transaxle and the power converter. By supporting the power converter by the brackets, vibration transmitted from the transaxle to the power converter is suppressed. In order to further suppress the vibration, an anti-vibratory bush is interposed between a housing of the power converter and the brackets. The housing of the electrical device has several connectors connected thereto. The power converter of JP 2017-47758 A has two connectors connected to its rear surface.

SUMMARY

When an electrical device is supported above a vehicle-mounted structure (transaxle) by a bracket, the electrical device may slide backward by a load applied from a front side upon when a vehicle crashes. A front compartment is installed with various devices, and there is not so much gap provided between the devices. When the electrical device slides backward, a connector connected to a back face thereof collides with another structure. To prevent an electric component to which a voltage in the connector is applied from being exposed, a strength that can withstand an impact from the collision with another structure is required in the connector. In a case where two connectors are connected to the back surface of a housing, it is costly to increase strengths of both connectors. The disclosure herein provides a structure that improves damage-proof properties of two connectors provided on a housing back face of an electrical device while suppressing cost.

The description herein discloses a mounting structure for an electrical device in a vehicle. The electrical device may be supported by a bracket above a structure with a gap in a front compartment of the vehicle. First and second connectors may be connected with a back face of a housing of the electrical device. In the vehicle mounting structure disclosed herein, the first connector may have a higher strength than the second connector. Further, a rear end of the first connector may be located on a rear side than a rear end of the second connector. In this vehicle mounting structure, when the electrical device slides backward, the first connector collides with another structure located on the rear side of the electrical device before the second connector collides. With the first connector enduring an impact colliding with the other structure, the second connector can be avoided from colliding to the other structure with a large impact. Due to this, a damage-proof property of the second connector can be increased without increasing the strength of the second connector. Cost for increasing the strength of the second connector can be saved. The vehicle mounting structure disclosed herein can improves damage-proof properties of the two connectors provided on the housing back face of the electrical device while suppressing the cost.

For further improving the damage-proof property of the first connector, an O-ring constituted of resin or rubber may be interposed between the first connector and the housing. The O-ring sealing an interface between the housing of the electrical device and the first connector functions as a shock absorber upon when the first connector collides with a structure located on the rear side. Details and further improvements on the technique disclosed herein will be described in the below Detailed Description.

DETAILED DESCRIPTION

Representative, non-limiting examples of the present invention will now be described in further detail with reference to the attached drawings. This detailed description is merely intended to teach a person of skill in the art further details for practicing preferred aspects of the present teachings and is not intended to limit the scope of the invention. Furthermore, each of the additional features and teachings disclosed below may be utilized separately or in conjunction with other features and teachings to provide improved a mounting structure for an electrical device in a vehicle, as well as methods for using and manufacturing the same.

Moreover, combinations of features and steps disclosed in the following detailed description may not be necessary to practice the invention in the broadest sense, and are instead taught merely to particularly describe representative examples of the invention. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Figure 1:
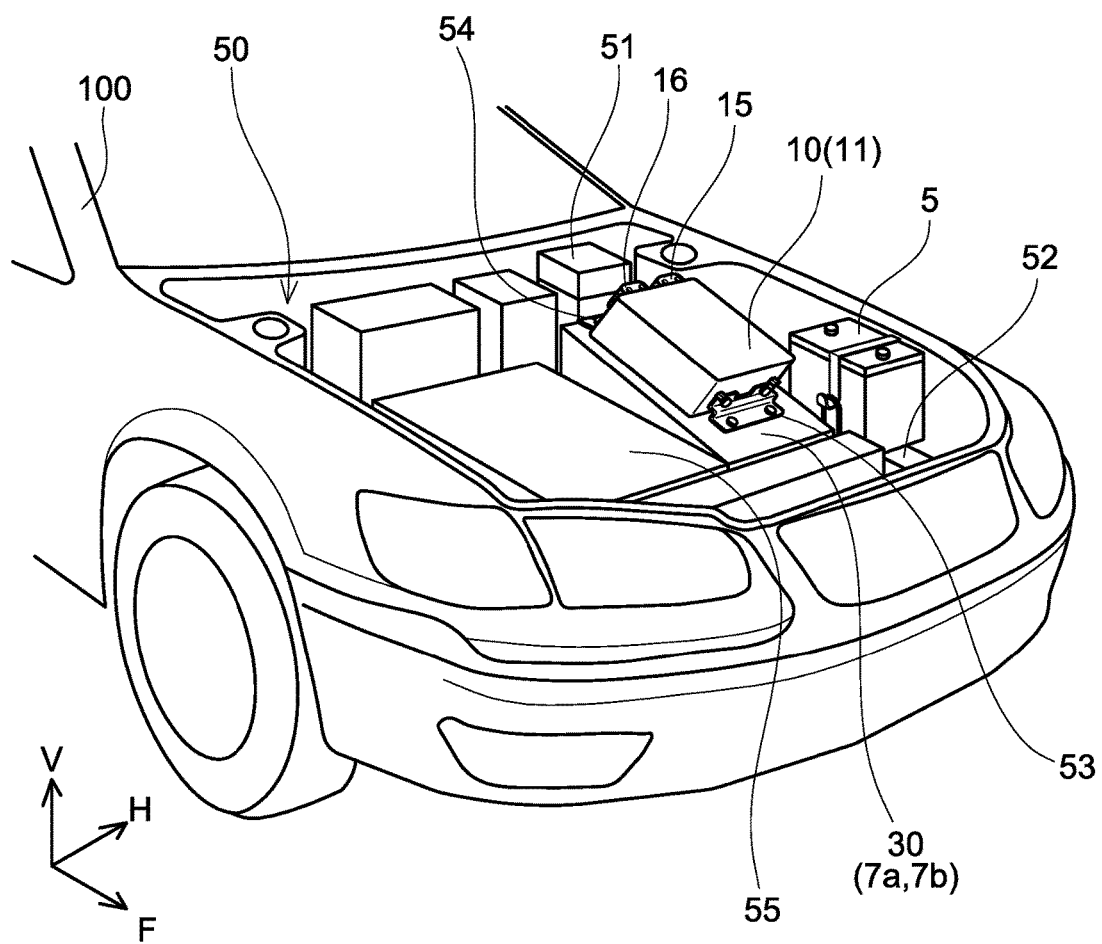
FIG. 1 is a perspective view showing a device layout in a front compartment in a hybrid vehicle.

A mounting structure for a vehicle of an embodiment will be described with reference to the drawings. The mounting structure for a vehicle of the embodiment is applied to a hybrid vehicle including an engine and a traction motor. FIG. 1 is a perspective view showing a device layout in a front compartment 50 of a hybrid vehicle 100. In a coordinate system in the drawings, a positive direction of an F axis indicates a vehicle frontward direction and a positive direction of a V axis indicates a vehicle upward direction. A positive direction of an H axis indicates a vehicle leftward direction. In FIG. 1, devices mounted in the front compartment 50 are depicted schematically.

The front compartment 50 houses an engine 55, a transaxle 30, a power converter 10, an auxiliary battery 5, and a brake actuator 51. The front compartment 50 houses various other devices, but depiction and explanation thereof will be omitted.

The hybrid vehicle 100 includes two traction motors 7a, 7b and the engine 55 for a locomotive purpose. The two motors 7a, 7b are housed in a housing of the transaxle 30. Aside from the two traction motors 7a, 7b, the transaxle 30 further includes a power distribution mechanism and a differential gear. The power distribution mechanism is a gear set configured to combine and distribute output torque of the engine 55 and output torque of the motors 7a, 7b. When high torque is required, the power distribution mechanism combines the output torque of the engine 55 and the output torque of the motors 7a, 7b and transmits the same to the differential gear. Further, the power distribution mechanism divides the output torque of the engine 55 according to situations and transmits the same to the differential gear and the motor 7a being one of the two. In such a case, the hybrid vehicle 100 runs on the engine torque while generating electricity in the motor 7a. The motor 7b being the other of the two also functions as a cell motor for starting the engine 55.

The engine 55 and the transaxle 30 are coupled so as to be adjacent each other in a vehicle width direction. The engine 55 and the transaxle 30 are bridged over two side members 52 that ensures structural strength of the vehicle. In FIG. 1, one of the side members cannot be seen.

The power converter 10 is fixed to an upper surface of the transaxle 30. The power converter 10 is a device that boosts DC power from a main battery that is not shown and converts the boosted DC power to AC power suitable for driving the motors. A reference sign 11 indicates a housing of the power converter 10.

Figure 2:
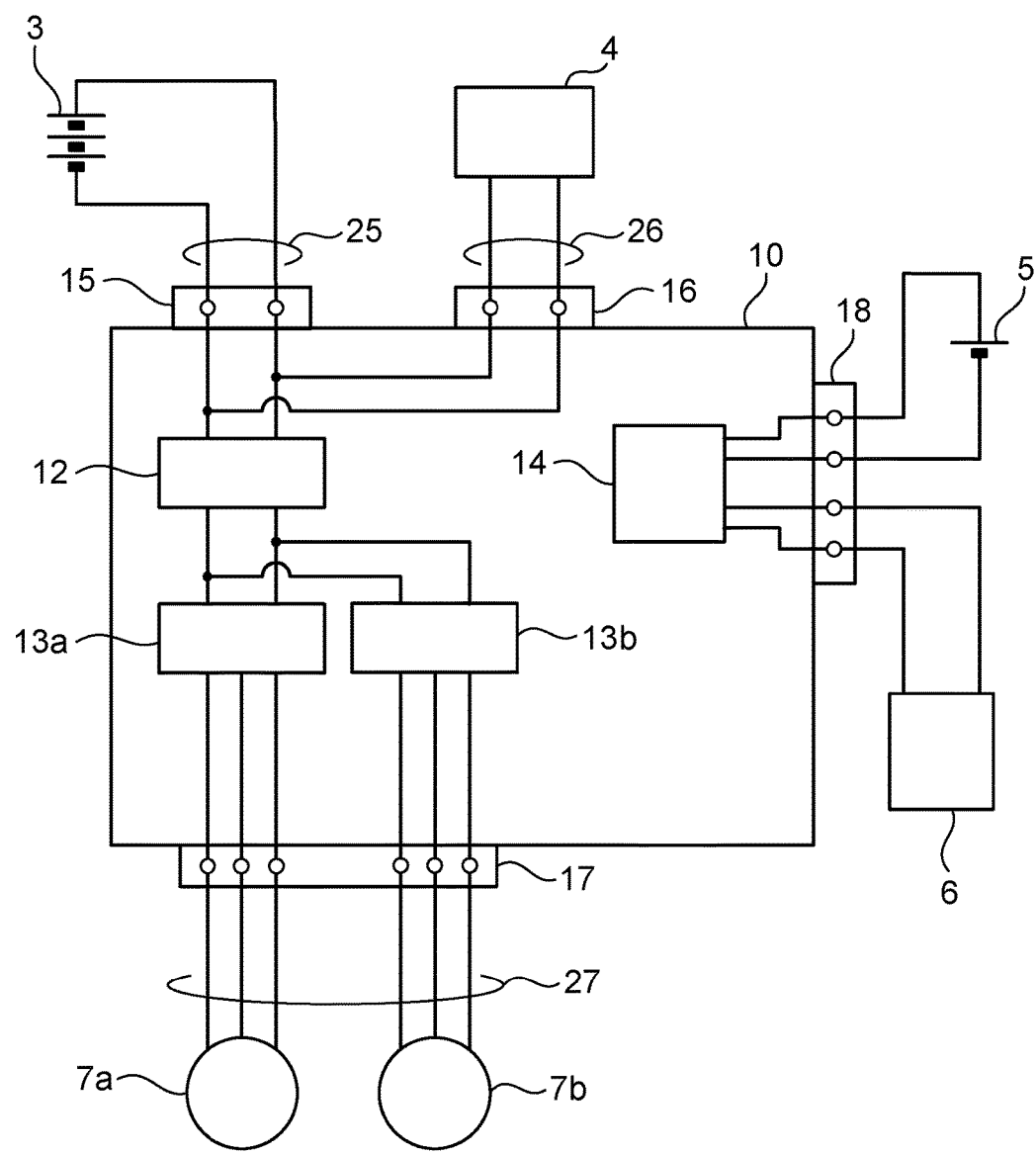
FIG. 2 is a block diagram of a power converter and peripheral devices thereof in the hybrid vehicle.

FIG. 2 shows a block diagram of an inside of the power converter 10 and peripheral devices thereof. The power converter 10 includes therein a converter circuit 12, two inverter circuits 13a, 13b, and a control board 14 configured to control the converter circuit 12 and the inverter circuits 13a, 13b.

The power converter 10 is connected to a main battery 3 via a DC power cable 25. A reference sign 15 indicates a connector (DC power connector 15) attached to a tip end of the DC power cable 25. An output of the main battery 3 is 100 volts or more, and the motors 7a, 7b are driven by the power from the main battery 3. The output power from the main battery 3 is inputted to the converter circuit 12. The converter circuit 12 boosts an output voltage of the main battery 3 and supplies the same to the inverter circuits 13a, 13b. The inverter circuits 13a, 13b converts the boosted DC power to the AC power suitable for driving the motors. Outputs from the inverter circuits 13a, 13b are supplied respectively to the motors 7a, 7b through a motor connector 17 and motor power cables 27.

The converter circuit 12 and the inverter circuits 13a, 13b are controlled by a control circuit implemented on the control board 14. The control circuit of the control board 14 operates by receiving power from the auxiliary battery 5. The control circuit of the control board 14 operates by receiving instructions from an external host controller 6. The auxiliary battery 5 and the host controller 6 are connected to the control board 14 of the power converter 10 via communication cables and a communication connector 18.

Aside from the control board 14 in the power converter 10, the auxiliary battery 5 supplies power to other devices that operate at 12 volts. The devices that operate at 12 volts among the devices mounted in the hybrid vehicle 100 are generally called auxiliary devices. The auxiliary battery 5 is mounted in the front compartment 50 (see FIG. 1).

The housing 11 of the power converter 10 serves as a power relay between the main battery 3 and an air compressor 4. The power from the main battery 3 is supplied to the air compressor 4 from the housing 11 through air conditioner cables 26 and an air conditioner connector 16.

Returning to FIG. 1, the device layout in the front compartment 50 will be continued. The power converter 10 is supported above the transaxle 30 by a front bracket 53 and a rear bracket 54. Two connectors (the Dc power connector 15 and the air conditioner connector 16) are connected to a rear face of the housing 11 of the power converter 10. The brake actuator 51 is arranged behind the power converter 10.

Figure 3:
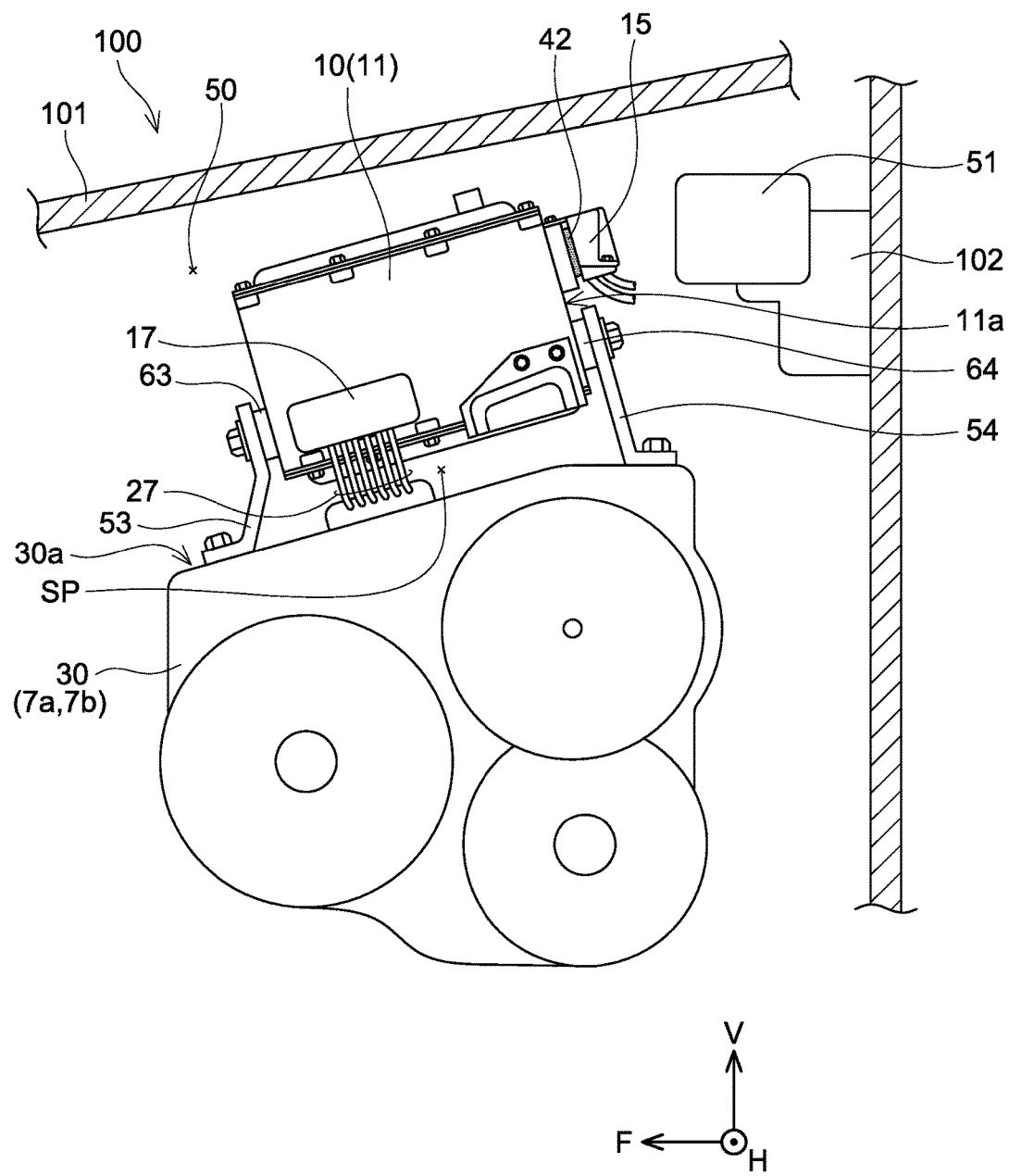
FIG. 3 is a side view showing a positional relationship of the power converter and a brake actuator.
Figure 4:
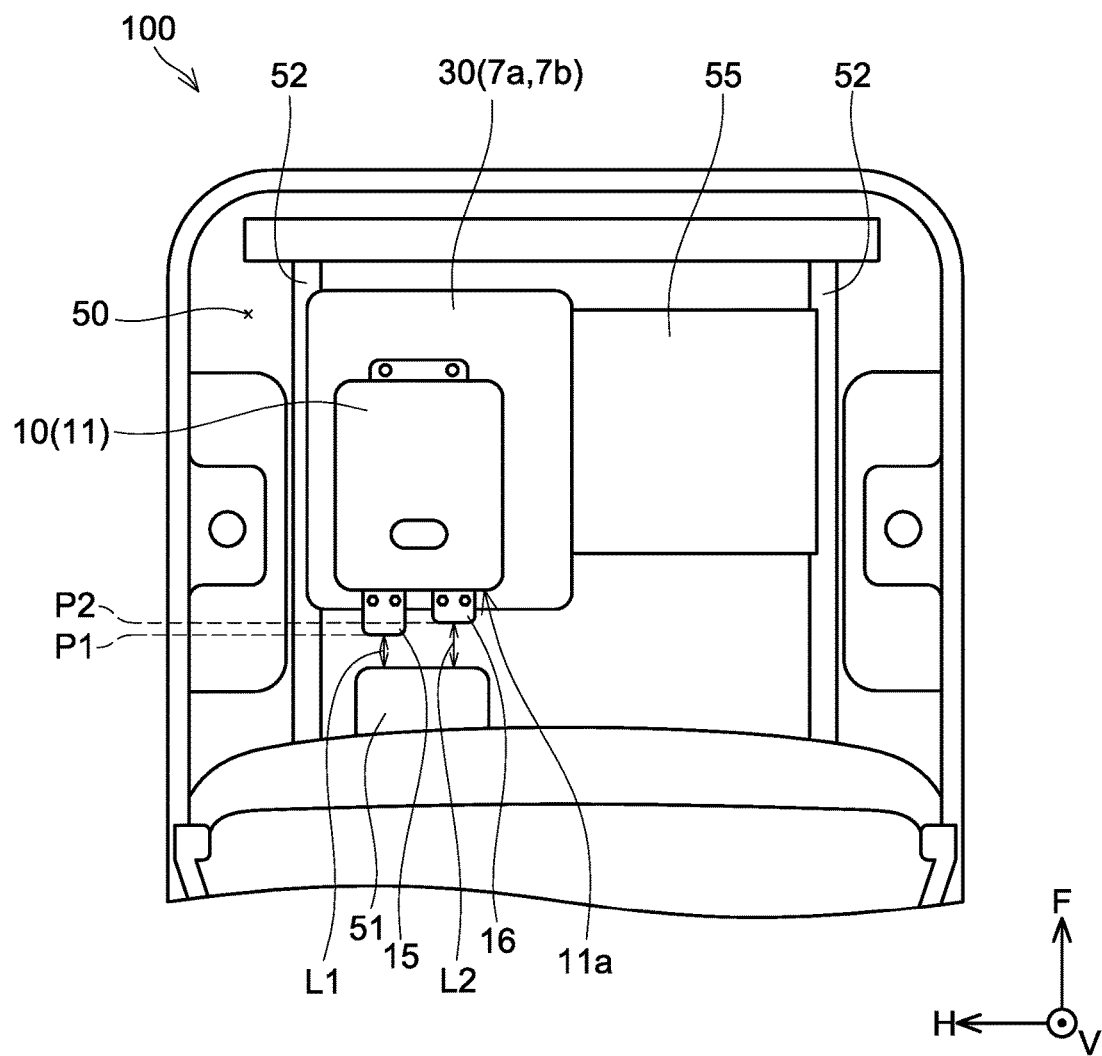
FIG. 4 is a plan view showing the positional relationship of the power converter and the brake actuator.

FIG. 3 is a side view showing a positional relationship of the power converter 10 and the brake actuator 51. FIG. 4 is a plan view showing the positional relationship of the power converter 10 and the brake actuator 51. In both FIGS. 3 and 4, the F-axis positive direction indicates the vehicle forward direction and the V-axis positive direction indicates the vehicle upward direction in the coordinate system. The H-axis positive direction indicates the vehicle leftward direction.

As aforementioned, the power converter 10 is supported on an upper surface 30a of the transaxle 30 via the front bracket 53 and the rear bracket 54. A gap SP is ensured between the power converter 10 and the transaxle 30. The power converter 10 is not directly fixed on the upper surface 30a of the transaxle 30 so as to insulate vibration from the transaxle 30. An anti-vibratory bush 63 is interposed between the front bracket 53 and the housing 11 of the power converter 10 (see FIG. 3). An anti-vibratory bush 64 is also interposed between the rear bracket 54 and the housing 11 (see FIG. 3).

A motor connector 17 is connected to a left side face of the housing 11, and the DC power connector 15 and the air conditioner connector 16 are connected to a rear face 11a of the housing 11. In FIG. 3, the air conditioner connector 16 is located behind the DC power connector 15 and thus cannot be seen. The communication connector 18 (see FIG. 2) is connected to an upper face of the housing 11, however, the depiction of the communication connector 18 is omitted in the drawing. An O-ring 42 constituted of rubber is interposed between the DC power connector 15 and the housing 11.

The power converter 10 is supported above the transaxle 30 by the two brackets 53, 54. When the hybrid vehicle 100 crashes on the front side, the brackets 53, 54 may deform or break, by which the power converter 10 slides backward. The two connectors (the DC power connector 15 and the air conditioner connector 16) are connected to the rear face 11*a* of the housing 11 of the power converter 10, behind which the brake actuator 51 is located. The brake actuator 51 is fixed to a vehicle body 102.

When the housing 11 slides backward, the two connectors (the DC power connector 15 and the air conditioner connector 16) are at a risk of colliding onto the brake actuator 51. When an impact upon such a collision is large, one or both of the connectors might be damaged. Both the DC power connector 15 and the air conditioner connector 16 are connected to the main battery, and a high voltage of 100 volts or greater is applied to terminals inside the connectors. It is therefore not desirable for the internal terminal to be short circuited or exposed when the connectors are damaged. The connectors can be improved of their damage-proof properties by increasing strengths of both the connectors. However, increasing the strengths of both connectors is costly. The vehicle mounting structure of this embodiment provides a structure that can improve the damage-proof properties of the two connectors (the DC power connector 15 and the air conditioner connector 16) while suppressing cost.

As shown in FIG. 4, a rear end P1 of the DC power connector 15 is located on a vehicle rear side than a rear end P2 of the air conditioner connector 16. A distance L1 between the DC power connector 15 and the brake actuator 51 is shorter than a distance L2 between the air conditioner connector 16 and the brake actuator 51. Thus, when the housing 11 slides backward, the DC power connector 15 collides with the brake actuator 51 first before the air conditioner connector 16 does. Since the rear end of the air conditioner connector 16 is located on the front side than the rear end of the DC power connector 15, the air conditioner connector 16 does not collide with the brake actuator 51, or does not receive a strong impact even in the event of colliding. Due to this, both the two connectors can be improved of their damage-proof properties by strengthening only the DC power connector 15 located rearward. Since the strength of the air conditioner connector 16 does not have to be increased to the strength of the DC power connector 15, the cost can thereby be suppressed. The strength described herein means a durability upon when load is applied from the rear side to the connector under a state in which the connector is attached to the housing 11. For example, the strength may be measured by a magnitude of the load that breaks the connector when the load is applied to the connector from the rear side. Further, for example, a main body of the DC power connector 15 and a main body of the air conditioner connector 16 may be constituted of aluminum, and the strength of the DC power connector 15 may be increased by employing aluminum for the DC power connector 15 with a greater thickness than that for the air conditioner connector 16. Alternatively, a protector constituted of hard metal may be attached to the DC power connector 15 to increase the strength of the DC power connector 15.

As aforementioned, the rubber O-ring is interposed between the rear face 11*a* of the housing 11 and the DC power connector 15 (see FIG. 3). The O-ring 42 prevents water from entering through an interface between the housing 11 and the DC power connector 15. The O-ring 42 also functions as a shock absorber upon when the DC power connector 15 collides with the brake actuator 51. The rubber O-ring 42 contributes to improving the strength of the DC power connector 15.

Figure 5:
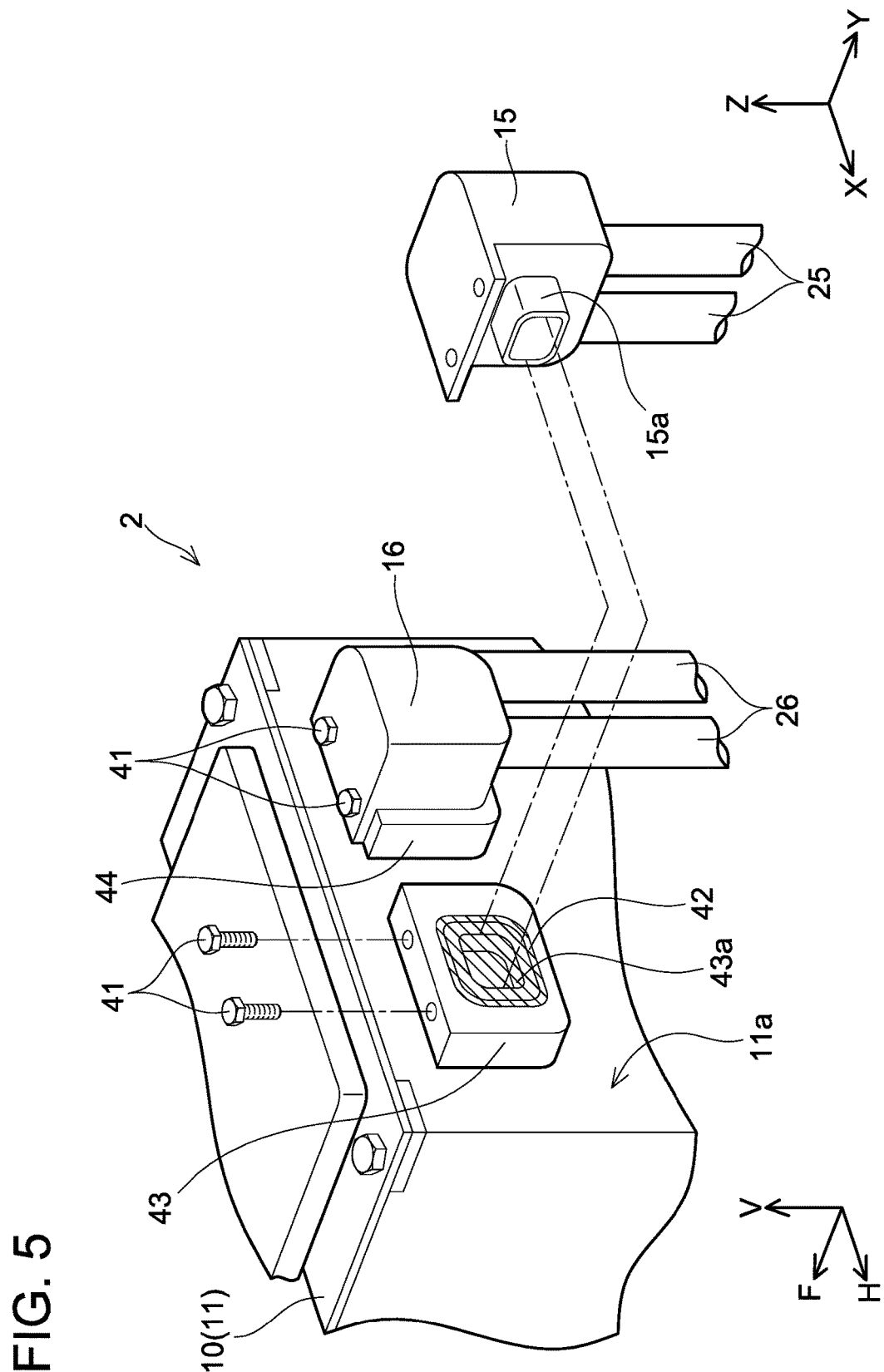
FIG. 5 is a partial perspective view including a rear face of the power converter.

A structure of the DC power connector 15 of the embodiment will be described in detail with reference to FIG. 5. The rear face 11*a* of the housing 11 of the power converter 10 is provided with connector receptacles 43, 44 for connector connection. The DC power connector 15 is connected to the connector receptacle 43. An opening 43*a* is provided at a center of the connector receptacle 43. An electric terminal (housing-side terminal) that is not shown is provided inside the opening 43*a*. A plug 15*a* of the DC power connector 15 is inserted to the opening 43*a*. An electric terminal (connector-side terminal) that is not shown is provided inside the plug 15*a*. When the DC power connector 15 is connected to the housing 11, the connector-side terminal of the plug 15*a* electrically connects with the housing-side terminal in the opening 43*a*. The connection of the connector-side terminal and the housing-side terminal may be configured by joint fastening using screws.

The O-ring 42 is arranged on a surface of the connector receptacle 43 so as to surround a periphery of the opening 43*a*. The O-ring 42 is constituted of rubber or resin. As aforementioned, the O-ring 42 in general prevents water entrance to the opening 43*a*. When the DC power connector 15 collides with the brake actuator 51, the O-ring 42 functions as the shock absorber that absorbs the impact. An upper portion of the DC power connector 15 is fixed to the housing 11 by two bolts 41.

The air conditioner connector 16 is connected to the connector receptacle 44. An opening is likewise provided in the connector receptacle 44, and a plug of the air conditioner connector 16 is inserted to this opening. An O-ring is provided also between the connector receptacle 44 and the air conditioner connector 16. The air conditioner connector 16 has its upper portion fixed to the housing 11 by two bolts 41, similar to the DC power connector 15.

The vehicle mounting structure of the embodiment has the following characteristics. The power converter 10 is supported above the transaxle 30 by the front bracket 53 and the rear bracket 54. The gap SP is secured between the power converter 10 and the transaxle 30. The DC power connector 15 and the air conditioner connector 16 are connected to the rear face 11*a* of the housing 11 (a back face of a housing) of the power converter 10. The metal brake actuator 51 is located behind the DC power connector 15 and the air conditioner connector 16. The strengths of the DC power connector 15 is higher than the strength of the air conditioner connector 16. The rear end of the DC power connector 15 is located on the rear side than the rear end of the air conditioner connector 16. When the power converter 10 slides backward, the DC power connector 15 collies with the brake actuator 51 first before the air conditioner connector 16 does. Since the DC power connector 15 has the higher strength than the air conditioner connector 16, it is less likely to be damaged by the collision with the brake actuator 51. On the other hand, since the DC power connector 15 serves as the shock absorber, the impact applied upon when the air conditioner connector 16 collides with the brake actuator 51 can be mitigated.

Some features of the technique described in the embodiment will be described. The power converter 10 in the embodiment corresponds to an example of an electrical device that is to be a target for the mounting structure in the vehicle. The transaxle 30 supporting the power converter 10 via the brackets 53, 54 corresponds to an example of a structure in the vehicle supporting the power converter 10 (electrical device). The DC power connector 15 corresponds to an example of a first connector, and the air conditioner connector 16 corresponds to an example of a second connector. The vehicle mounting structure of the embodiment is applied to the power converter 10 of the hybrid vehicle 100.

The vehicle mounting structure disclosed herein may be applied to other types of electrical devices of other types of vehicles. The vehicle mounting structure disclosed herein may be applied to an electrical device to which a connector is connected, other than the DC power connector 15 and the air conditioner connector 16.

The configuration in which rear end of the first connector (DC power connector 15) is located on the rear side than the rear end of the second connector (air conditioner connector 16) may employ the first connector having a longer length in a front-and-rear direction of the vehicle than the second connector. Alternatively, a step may be provided on the rear face of the housing to which the first connector and the second connector are to be attached, and a connecting portion of the first connector and the housing may be configured to be located on the vehicle rear side than a connecting portion of the second connector and the housing. By configuring as such, even if a length of the first connector is equal to a length of the second connector, the rear end of the first connector may be arranged on the rear side than the rear end of the second connector.

The structure located behind the connectors connected to the back face of the electrical device may not be the brake actuator 51. The electrical device may be supported by a bracket supporting its lateral portion with a gap above the structure of the vehicle.

What is claimed is:

1. A mounting structure for an electrical device in a vehicle, the mounting structure comprising:
    the electrical device supported by a bracket above a structure with a gap in a front compartment of the vehicle;
    a first connector connected with a back face of a housing of the electrical device; and
    a second connector connected with the back face of the housing,
    wherein:
        the first connector has a higher strength than a strength of the second connector, and
        a rear end of the first connector is located further rear with respect to a front-rear direction of the vehicle than a rear end of the second connector.

2. The mounting structure according to claim 1, wherein an O-ring constituted of resin or rubber is interposed between the first connector and the housing of the electrical device.

* * * * *